United States Patent [19]

Ponginibbio

[11] 4,334,663

[45] Jun. 15, 1982

[54] MOLDS FOR THE PRODUCTION OF DISHES AND THE LIKE FROM POWDERED CERAMIC MATERIALS

[75] Inventor: Franco Ponginibbio, Milan, Italy

[73] Assignee: Welko Industriale S.p.A., Milan, Italy

[21] Appl. No.: 209,290

[22] Filed: Nov. 21, 1980

[30] Foreign Application Priority Data

Dec. 7, 1979 [IT] Italy .............................. 27939 A/79

[51] Int. Cl.[3] .......................... B29C 1/00; B29C 5/00; B29F 1/022

[52] U.S. Cl. .................................... 249/105; 249/160; 249/162; 425/567; 425/352; 425/408; 425/411

[58] Field of Search ............... 249/120, 126, 160, 161, 249/141, 117, 328.1, 328.2, 328.4, 105, 162; 425/258, 354, 542, 544, 567, 569, 572, 574, 589, 29 R, 176, 177, 233, 234, 354, 355, 447; 164/113, 133, 136, 303, 306, 312

[56] References Cited

U.S. PATENT DOCUMENTS

| | | | |
|---|---|---|---|
| 1,575,688 | 3/1926 | Joannides | 425/129 |
| 1,868,425 | 7/1932 | Miller | 264/328.2 |
| 2,422,809 | 6/1947 | Stupakoff et al. | 264/328.4 |
| 2,446,872 | 10/1948 | Ehlers | 264/328.2 |
| 2,615,229 | 10/1952 | Blackburn et al. | 425/176 |
| 2,627,641 | 2/1953 | Steele et al. | 249/160 |
| 3,579,739 | 5/1966 | Cosier | 425/129 |

*Primary Examiner*—Willard E. Hoag
*Attorney, Agent, or Firm*—Michael J. Striker

[57] ABSTRACT

The invention relates to a mold for the production of dishes from powdered ceramic materials wherein two coaxial cylindrical dies are displaceable to generate with their end facing walls a cavity to be filled with the powdered ceramic materials, said cavity being peripherally completed by a displaceable die-box provided with a vertical conduit through which the ceramic material is fed into said cavity. An auxiliary die-box is provided sideways on said die-box, displaceable at least along one of said cylindrical dies, the lateral facing walls of said die-box and of said auxiliary die-box (16) being provided with annular grooves that in the closed condition of said lateral walls generate an annular cavity that may be registered in correspondence with said first-mentioned cavity of the mold, radially prolonging the latter and forming the peripheral border of the dish to be produced.

4 Claims, 11 Drawing Figures

MOLDS FOR THE PRODUCTION OF DISHES AND THE LIKE FROM POWDERED CERAMIC MATERIALS

BACKGROUND OF THE INVENTION

This invention relates to some improvements to the molds employed for the production of ceramic dishes, or the like, of the kind mountable on horizontal presses. According to the prior art, molds for the production of ceramic dishes on horizontal presses, are known and are composed by two coaxial cylindrical dies, having equal diameter, respectively constituting a die and a counter-die, at least one of which being axially disposable with respect to the other said dies include end walls facing each other and reproducing, in negative, respectively the front and the rear conformation of the dish to be molded. Said cylindrical coaxial dies are surrounded by a movable die-box, that hereinafter will be called a main die-box having a cylindrical cavity the diameter of which is a bit greater than the diameters of the cylindrical dies. Said main die-box is provided with a passing vertical inner duct communicating with a hopper, from which the powdered ceramic material to be pressed is fed into a cavity defined by a predetermined spacement of the end walls of the cylindrical die and the counter-die. The cylindrical inner wall of the die-box has the function to peripherally delimit the cavity to be fed with the powdered material and to define the peripheral edge of the molded dishes.

Due to the fact that the cylindrical wall of the main die-box must necessarily have a diameter greater than the cylindrical coaxial dies, to be able to run along the latter, the pieces obtained by the employment of the mold show the peripheral edge flattened and provided with several flashes, so that the molded pieces must be machined to spud off and to round the peripheral edge by means of suitable grinding machines, with time consuming and expensive operations.

SUMMARY OF THE INVENTION

The mold of present invention has the aim to avoid the above discussed disadvantages and is characterized in that an auxiliary die-box is provided encircling and slidable at least on a cylindrical die, and displaceable with respect to the main die-box, to be spaced from the latter or approached to it on the facing lateral walls of the main die-box and of the auxiliary die-box, annular grooves are provided which are open toward the encircled cylindrical dies and and conformed such in a way that in the contacting condition of the main and auxiliary die-boxes they perform an annular cavity that may be registered in correspondence with the periphery of the cavity of the mold, radially prolonging the latter and forming the peripheral border of the dish to be produced.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE INVENTION

In the different figures, similar members or members having similar functions are indicated with the same reference numbers. In the same figures, all the members and all the means designed to hold, guide and cause, at the right moment, the axial displacement of the cylindrical dies and of the die-box, have not been represented because they are the components of an horizontal press which is already known and they do not affect the features of the present invention.

Figure 1:
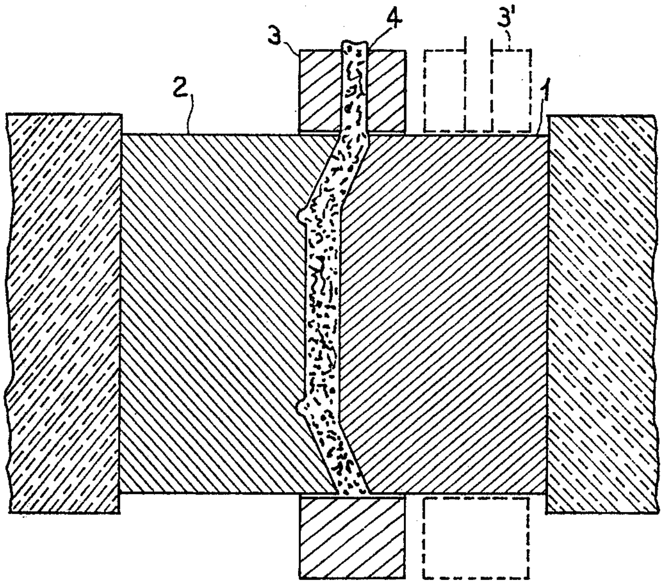
FIGS. 1 and 2 show a longitudinal section of a mold for the production of ceramic dishes according to the known art, respectively in the feeding condition and in the pressing condition.
Figure 2:
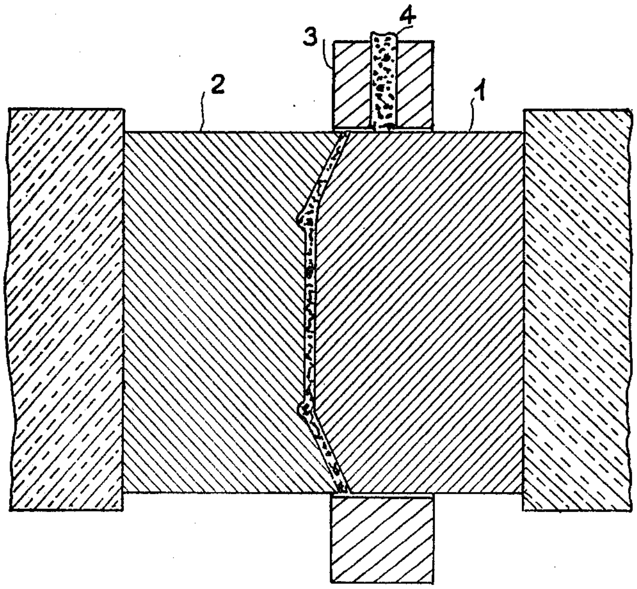

In FIGS. 1 and 2 a mold for the production of ceramic dishes has been depicted, as embodied according to the known art. Said mold comprises a die 1, a counter-die 2 and a main die-box 3. The die and the counter-die are both cylindrical and having circular sections with the same diameter and are coaxial; the opposite end walls of dies 1 and 2 are shaped as to reproduce, in negative, respectively the front and the rear conformation of the dish to be pressed.

In the main die-box 3, designed to truncate the peripheral edge of the dish and provided with a cylindrical cavity surrounding the dies 1 and 2 and having a diameter a bit greater than the diameter of said dies. A vertical conduit 4 is provided to feed the powdered ceramic material in the cavity generated between the opposed walls of the cylindrical dies, suitably spaced from each other. The powdered ceramic material is discharged from a hopper, not represented, after the displacement of the main die-box from the position 3' indicated in dotted lines to the position indicated in full fines.

In FIG. 2, the same mold is represented in the condition of the pressing step, after displacement of the main die-box 3 in a position that peripherially closes the cavity of the mold. When considering FIGS. 1 and 2, it can be realized that after the pressing step, the produced dish is provided with the peripheral edge simply truncated and flattened and usually accompanied with many flashes that must be eliminated by means of elaborate grinding and finishing operations.

Figure 3:
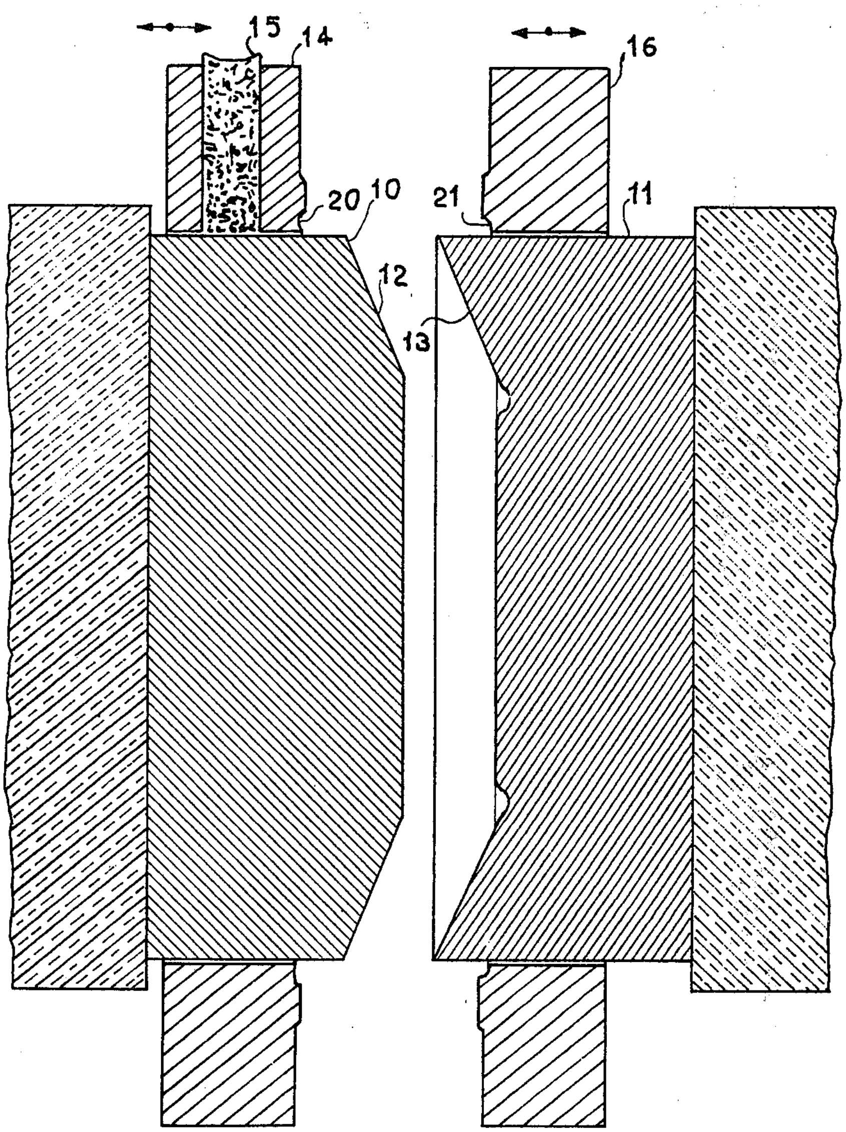
FIG. 3 shows in a more enlarged scale and in a longitudinal section a mold for producing ceramic dishes, according to the present invention, in the resting or inoperative position.

In FIG. 3 it is represented a mold according to the present invention in the resting or inoperative condition.

Said mold is composed by a cylindrical die 10, and a cylindrical counter-die 11, both having equal diameter and being coaxial with each other. The opposed walls 12 and 13 of the dies are shaped as to reproduce, in negative, the front and rear conformation of the dishes to be pressed, except for a peripheral border of the dishes to be produced.

A main die-box 14 is slidably disposed along said cylindrical dies, said main die-box 14 being provided with a vertical conduit 15 that upwardly comunicates with a hopper (not shown) and is downwardly open upon the cylindrical dies 11 and 12 for the purposes that will be described hereinafter. On the counter-die 11, it is slidably disposed an auxiliary die-box 16 that can be spaced from the die-box 14 or approached to it.

Figure 4:
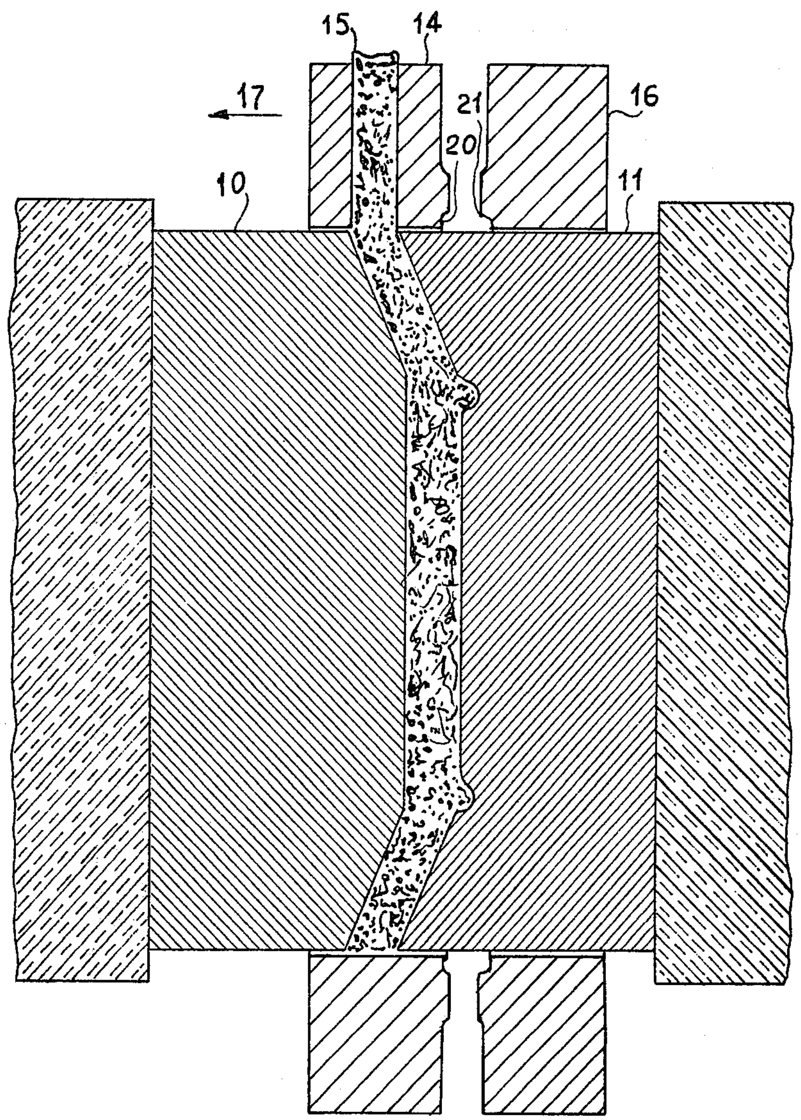
FIG. 4 shows the same mold wherein the cylindrical dies are spaced for limiting the filling cavity.

As shown in FIGS. 3 and 4, on the facing lateral walls of the main die-box 14 and of the auxiliary die-box 16 respective annular grooves 20 and 21 are provided, shaped in such a way that, when the facing walls are brought into contact, they reproduce the negative shape of the peripheral border of the dishes to be produced and may constitute a radial prolongment of the cavity of the mold.

Figure 5:
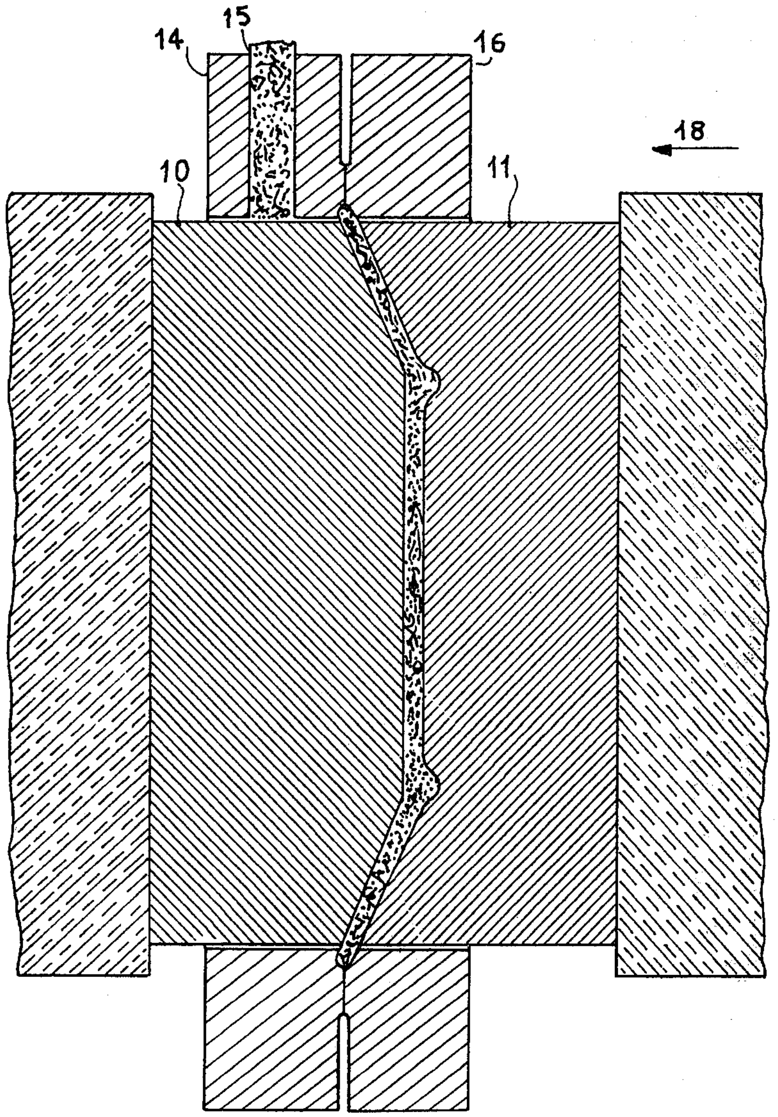
FIG. 5 shows the same mold in the pressing condition.

In effect, from the condition shown in FIG. 4, wherein the cylindrical dies 10 and 11 are spaced to define the cavity to be filled with the right amount of material for pressing a dish and wherein the material is fed through the conduit 15 of the main die-box 14 suitably displaced, according to the arrow 17, the mold is disposed as shown in FIG. 5, wherein the auxiliary die-box 16 is displaced according to the arrow 18 up to get in contact with the main die-box 14 and then both dies are displaced so that the annular cavity formed by the grooves 20 and 21 is registered in correspondence with the cavity formed by the cylindrical dies 10 and 11.

In these conditions, the cylindrical die 11 is displaced in the pressing position, so that the powdered ceramic material is pressed and expanded to fill said annular cavity as clearly depicted in FIG. 5, forming the dish and its peripheral border, suitably rounded.

In FIGS. 6 to 11 there are represented the successive steps of a pressing cycle of the mold.

Figure 6:
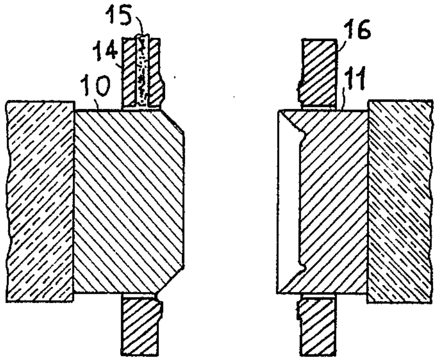
FIGS. 6 to 11 show, in a reduced scale, the successive conditions of the mold when performing the pressing cycle of the ceramic dish.

FIG. 6 shows the mold in the resting or inoperative position, wherein the cylindrical dies 10 and 11 are appreciably spaced one with respect to the other.

Figure 7:
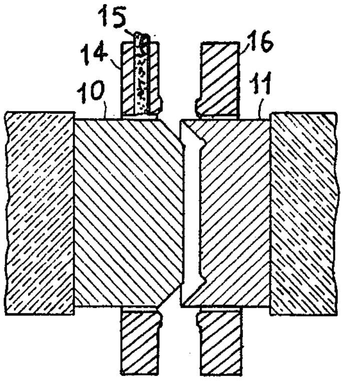

FIG. 7 shows the mold wherein the cylindrical die 11 is approached to the cylindrical die 10, to define the filling cavity of the mold.

Figure 8:
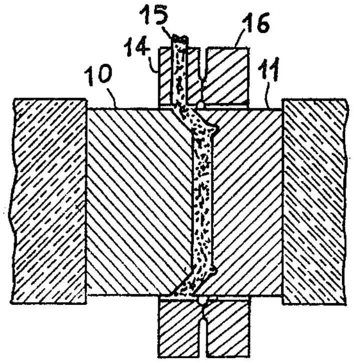

FIG. 8 shows the successive step wherein the main die-box 14 is displaced to locate the conduit 15 in correspondence with said filling cavity, so that the powdered ceramic material is fed into the mold.

Figure 9:
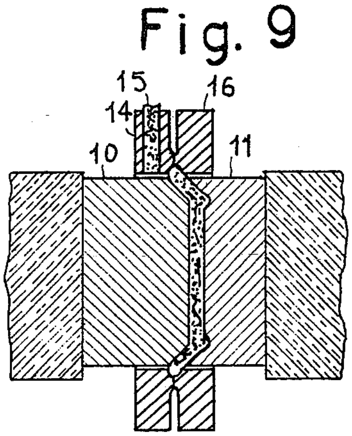

FIG. 9 shows the successive step wherein the main die-box 14 and the auxiliary die-box 16 come into contact and are both displaced to register the annular cavity in correspondence with the cavity filled with the material.

Figure 10:
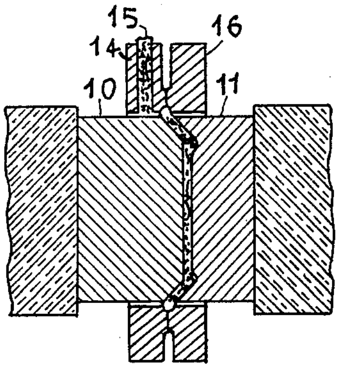

FIG. 10 shows the pressing step corresponding to FIG. 5.

Figure 11:
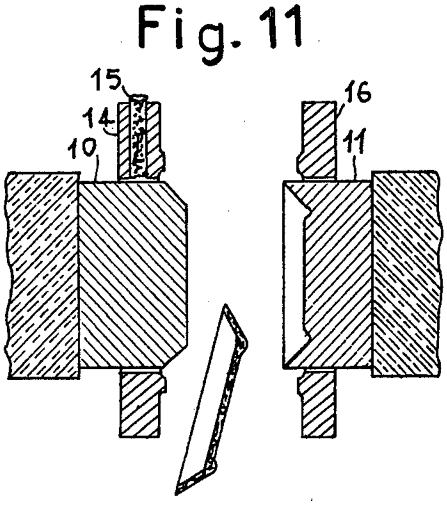

FIG. 11 discloses the last step wherein the cylindrical die 11 is retracted in the position of FIG. 6 as well as the auxiliary die-box 16, so that the pressed dish is allowed to drop out of the mold by gravity.

In the embodiment shown in the accompanying drawings, grooves 20 and 21 (FIGS. 3 and 4) are directly provided respectively on the bodies of the main die-box 14 and of the auxiliary die-box 16.

In a further embodiment of the invention said grooves 20 and 21 may be provided on respective separated annular members designed to be mounted and fixed, for instance by screws, to the bodies of the die-box 14 and the auxiliary die-box 16.

This description is made only by way of example and not as a limitation of the scope of the invention; many variations and modifications may be made and will become apperent to those skilled in the art; said modifications and variations fall within the true spirit and scope of the invention as pointed out by the appended claims.

I claim:

1. A mold for pressing ceramic dishes and the like from powder ceramic material, comprising two cylindrical dies of substantially identical diameters, each having a longitudinal axis and being coaxially positioned with each other, at least one of said dies being displaceable with respect to the other between an open and closed positions, said dies having end walls being shaped as to reproduce, in negative, respectively the front and the rear walls of the dish to be produced and to define a cavity between said walls when said dies are in said closed position; a main die-box encircling said cylindrical dies and adapted to slide along said longitudinal axes for peripherally closing said cavity, said main die-box including a conduit for feeding the powdered ceramic material into said first cavity; and an auxiliary die-box encircling at least one of said dies and adapted to be displaced along said longitudinal axes towards and from of said main die-box, said main die-box and said auxiliary die-box formed with annular grooves facing towards each other and open towards said dies, said grooves being conformed with each other, so that in said closed position they form an annular cavity being in registry with said cavity and radially extending therefrom whereby said annular cavity forms the peripheral border of the dish to be produced.

2. The mold of claim 1, wherein said main die-box has a first lateral face and said auxiliary die-box has a second lateral face facing towards said first face, said grooves being formed on said first and second faces, respectively.

3. The mold of claim 1, wherein said main die-box is provided with a first annular element and said auxiliary die-box is provided with a second annular element facing towards said first annular element, said grooves being formed in said first and second annular elements, respectively.

4. The mold of claim 1, wherein said conduit is formed by a channel extending normal to said longitudinal axis.

* * * * *